United States Patent
Yang et al.

(10) Patent No.: US 9,414,427 B2
(45) Date of Patent: Aug. 9, 2016

(54) LINK ADAPTATION TRANSMISSION AND RECEPTION METHOD IN DEVICE-TO-DEVICE COMMUNICATION BASED CELLULAR MOBILE COMMUNICATION SYSTEM

(71) Applicant: Electronics and Telecommunications Research Institute, Daejeon (KR)

(72) Inventors: Mi Jeong Yang, Daejeon (KR); Soon Yong Lim, Daejeon (KR); Hyeong Jun Park, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 223 days.

(21) Appl. No.: 14/036,830

(22) Filed: Sep. 25, 2013

(65) Prior Publication Data

US 2014/0087744 A1    Mar. 27, 2014

(30) Foreign Application Priority Data

Sep. 25, 2012    (KR) .................. 10-2012-0106252

(51) Int. Cl.
*H04W 76/04*    (2009.01)
*H04W 76/02*    (2009.01)

(52) U.S. Cl.
CPC .......... *H04W 76/043* (2013.01); *H04W 76/023* (2013.01)

(58) Field of Classification Search
CPC . H04W 76/023; H04W 76/043; H04W 76/04; H04L 1/0003
USPC ............ 455/450, 426.1, 422.1; 370/254, 328, 370/331, 280
See application file for complete search history.

(56) References Cited

U.S. PATENT DOCUMENTS

| | | | |
|---|---|---|---|
| 8,041,375 B2 | 10/2011 | Laroia et al. | |
| 2010/0165882 A1* | 7/2010 | Palanki et al. | 370/254 |
| 2012/0020234 A1 | 1/2012 | Laroia et al. | |
| 2012/0163252 A1* | 6/2012 | Ahn et al. | 370/280 |
| 2013/0223352 A1* | 8/2013 | Sartori | H04W 76/023 370/329 |
| 2013/0324114 A1* | 12/2013 | Raghothaman et al. | 455/426.1 |

FOREIGN PATENT DOCUMENTS

| | | |
|---|---|---|
| KR | 10-2009-0092496 | 9/2009 |
| KR | 10-2010-0085153 | 7/2010 |
| KR | 10-2010-0087349 | 8/2010 |
| KR | 10-2010-0095945 | 9/2010 |
| KR | 10-2012-0074251 | 7/2012 |

\* cited by examiner

*Primary Examiner* — William Nealon
(74) *Attorney, Agent, or Firm* — Nelson Mullins Riley & Scarborough LLP (57) ABSTRACT

Provided is a link adaptation transmission and reception method in device-to-device (D2D) communication based on cellular mobile communication. An operation method of a terminal in the link adaptation method according to the present invention includes receiving information related to a first transmission through a D2D link, performing transmission for an opposite terminal using the information related to the first transmission, and determining information related to a second transmission after the transmission based on reception from the opposite terminal. Using the link adaptation method according to the present invention, an adaptive modulation and coding scheme may be provided at the time of data transmission on a D2D link while minimizing control of a base station, thereby reducing the complexity of a cellular network due to the D2D communication.

10 Claims, 5 Drawing Sheets

LINK ADAPTATION TRANSMISSION AND RECEPTION METHOD IN DEVICE-TO-DEVICE COMMUNICATION BASED CELLULAR MOBILE COMMUNICATION SYSTEM

CLAIM FOR PRIORITY

This application claims priority to Korean Patent Application No. 2012-0106252 filed on Sep. 25, 2012 in the Korean Intellectual Property Office (KIPO), the entire contents of which are hereby incorporated by reference.

BACKGROUND

1. Technical Field

Example embodiments of the present invention relate in general to an operation method of a cellular mobile communication system, and more specifically to a link adaption transmission and reception method when performing device-to-device (D2D) communication in a cellular mobile communication system.

2. Related Art

Device-to-device (hereinafter, referred to as "D2D") communication technologies in a cellular mobile communication system are technologies in which adjacent terminals of a cellular mobile communication network set a D2D link as a cellular interface, and then directly transmit and receive data through the set D2D link.

Such D2D technologies aim to accelerate a transmission speed of cell boundary users without any increase in infrastructure costs, support cellular network connection of devices existing in shadow areas, and increase a system capacity due to interference reduction.

The D2D technologies in the cellular mobile communication system have advantages in that they have wider cell coverage, excellent security, and the like compared to existing WiFi Direct, Bluetooth, Zigbee technologies, and therefore standardization of the D2D technologies is in progress even in $3^{rd}$ generation partnership project (3GPP).

In an LTE/LTE-advanced based mobile communication system, a technology for compensating for a changed channel status is called link adaptation, and for this, a data rate may be controlled by adjusting a modulation and/or channel coding scheme. This is called adaptive modulation and coding.

Meanwhile, when applying existing adaptive modulation and coding technology to the D2D communication based on a cellular mobile communication, an increase in the complexity of control in a base station and a D2D communication terminal (hereinafter, referred to as "device") may be caused.

SUMMARY

Accordingly, example embodiments of the present invention are provided to substantially obviate one or more problems due to limitations and disadvantages of the related art.

Example embodiments of the present invention provide an operation method of a terminal as a link adaptation method applied to device-to-device (D2D) communication based on a cellular mobile communication system, which may compensate for a changed channel status of a D2D link without increasing the complexity of control signals between a base station and a terminal.

Example embodiments of the present invention also provide an operation method of a base station as a link adaptation method applied to D2D communication based on a cellular mobile communication system, which may compensate for a changed channel status of a D2D link without increasing the complexity of control signals between a base station and a terminal.

In some example embodiments, an operation method of a terminal in a link adaptation transmission method of device-to-device (D2D) communication, includes: receiving information related to a first transmission from a base station through a D2D link; performing transmission for an opposite terminal using the information related to the first transmission; and determining information related to a second transmission after the transmission based on reception from the opposite terminal.

Here, the operation method may further include measuring, by the terminal, a link status with the opposite terminal to report the measurement result to the base station.

Also, the terminal may measure the link status with the opposite terminal to report the measurement result to the base station in response to a link status measurement request with the opposite terminal from the base station.

Also, the information related to the first transmission may include at least one of a radio resource for data transmission, a modulation and coding scheme (MCS) to be used in data transmission, transmission power-related information for data transmission, and a transmission mode for data transmission.

Also, when the information related to the first transmission includes information related to the radio resource for data transmission, the information related to the first transmission may further include information about a valid term of the radio resource for data transmission.

Also, during the valid term, data transmission through the D2D link may be controlled through direct signaling between the terminal and the opposite terminal.

Also, the information related to the first transmission may be received from the base station using a radio resource control (RRC) layer message or a downlink control channel.

Also, the determining of the information related to the second transmission may include determining the information related to the second transmission using at least one whether an acknowledgement (ACK) or negative ACK (NACK) message is received from the opposite terminal, reception quality of the ACK or NACK message from the opposite terminal, a parameter included in the ACK or NACK message from the opposite terminal, and data reception quality from the opposite terminal.

In other example embodiments, an operation method of a base station in a link adaptation transmission method of D2D communication, includes: receiving measured information of a D2D link from at least one terminal among terminal pairs participating in the D2D communication; determining information related to a first transmission through the D2D link based on the measured information; and transmitting the information related to the first transmission to the at least one terminal among the terminal pairs participating in the D2D communication.

Here, the operation method may further include receiving, by the base station, a data transmission request for an opposite terminal from the at least one terminal of the terminal pairs participating in the D2D communication, and requesting link status measurement for the D2D link from the at least one terminal of the terminal pairs participating in the D2D communication.

Also, the information related to the first transmission may include at least one of a radio resource for data transmission, an MCS to be used in data transmission, transmission power-related information for data transmission, and a transmission mode for data transmission.

Also, when the information related to the first transmission includes information related to the radio resource for data transmission, the information related to the first transmission may further include information about a valid term of the radio resource for data transmission.

Also, the information related to the first transmission may be transmitted from the base station to the opposite terminal using an RRC layer message or a downlink control channel.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are disclosed herein. However, specific structural and functional details disclosed herein are merely representative for purposes of describing example embodiments of the present invention, and example embodiments of the present invention may be embodied in many alternate forms and should not be construed as being limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises", "comprising,", "includes," and/or "including", when used herein, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

"Terminal" or "device" may be used in the present specification in reference to a mobile station (MS), user equipment (UE), a user terminal (UT), a wireless terminal, an access terminal (AT), a terminal, a subscriber unit, a subscriber station (SS), a wireless device, a wireless transmission/reception unit (WTRU), a mobile node, a mobile, or other devices.

A variety of examples of a terminal may include a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, music storage and playback appliances having a communication function, Internet appliances enabling wireless Internet access and browsing, and portable units or terminals in which combinations of the these functions are integrated, but are not limited thereto.

"Base station" used in the present application generally refers to a fixed or moving point that communicates with a terminal, and may be a collective name for a base station, a node-B, an eNode-B, a base transceiver system (BTS), an access point, a relay, and a femto-cell, and the like.

Hereinafter, preferred embodiments of the present invention will be described in detail with reference to the accompanying drawings. In the drawings and description, elements that appear in more than one drawing and/or elements that are mentioned in more than one place in the description are always denoted by the same respective reference numerals and are not described in detail more than once.

Figure 1:
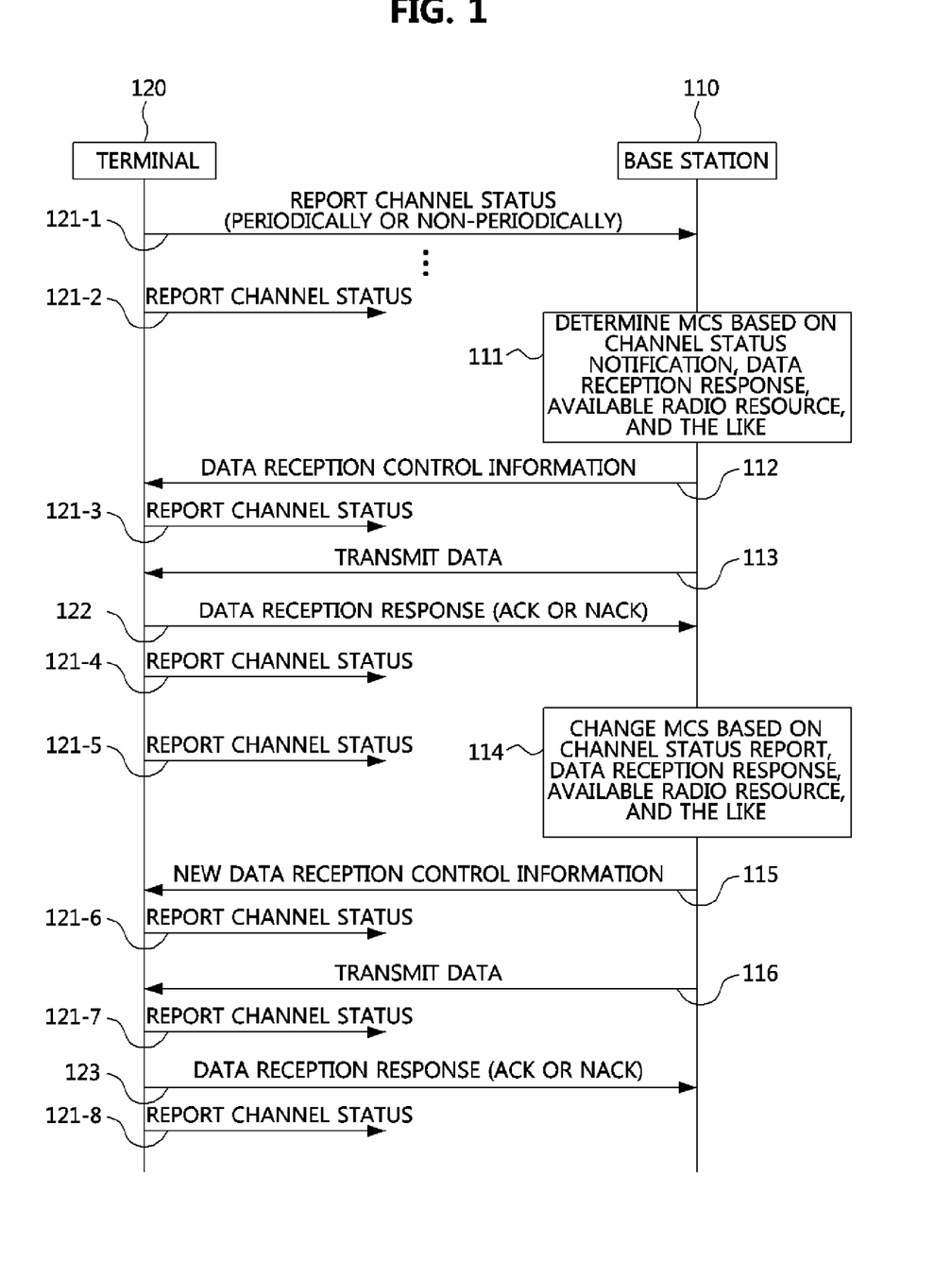
FIG. 1 is a message flowchart between a base station and a terminal for describing a link adaptation method in a cellular-based mobile communication system.

FIG. 1 is a message flowchart between a base station and a terminal for describing a link adaptation method in a cellular-based mobile communication system.

A link adaptation transmission and reception method of a cellular-based mobile communication system shown in FIG. 1 is described based on $3^{rd}$ generation partnership project long term evolution (3GPP LTE), but the link adaptation method may be applied in a similar manner even in other cellular mobile communication systems.

Referring to FIG. 1, in operations 121-1 to 121-8, a base station 110 should periodically or non-periodically receive a channel status notification from a terminal 120 for the purpose of adaptive modulation and coding-based data transmission to the terminal 120.

For example, a channel quality indicator (CQI) may be included in the channel status notification.

The channel status notification is used to advise a modulation and coding scheme (MCS) desired to be used when a base station transmits data to a terminal, and the base station determines an MCS of actual transmission data based on the advised MCS to notify the determined MCS to the terminal through downlink control information (DCI) 112 in operation 111.

In operation 122, the terminal performs, based on MCS information of the DCI, a reception operation for demodulating and decoding data 113 to be transmitted by the base station, and notifies the reception result to the base station as data reception response (ACK or NACK).

The base station determines new MCS again based on a channel status notification to be notified by the terminal, data reception response (ACK or NACK), and available radio resources in operation 114, and notify the determined MCS to the terminal as DCI in operation 115.

The terminal receives data 116 transmitted by the terminal based on the MCS information of the DCI, and repeats data reception response (ACK or NACK) in operation 123.

In such existing link adaptation technologies, a base station that allocates radio resources may determine MCS for data transmission with reference to a CQI provided by a terminal, and the terminal may accept the determined MCS.

In addition, for rapid link adaptation, the terminal should periodically or non-periodically provide a large amount of CQI to the base station.

In order to apply the above-described adaptive modulation and coding technology to device-to-device (D2D) communication based on cellular mobile communication, the following restrictions exist.

The D2D communication based on cellular mobile communication may be performed between devices, but the base station may allocate resources (frequency and time) for data communication between devices.

For efficiency of control signaling for such resource allocation, in the D2D communication based on cellular mobile communication, the base station may allocate frequency resources which can be used by two devices for a predetermined period of time instead of increasing complexity of control signals by allocating communication resources every time when communication between devices is performed.

However, even in this case, the base station should recognize a change in characteristics of a D2D link by continuously receiving a status notification for the D2D link, and should continuously control to change MCS accordingly.

This may means that, even though separated resources are provided to D2D communication, a large number of cellular control signals (CQI transmission and DCI transmission for applying changed MCS in a D2D device) for link adaptation may be generated during D2D communication.

Therefore, when the above-described link adaptation method is applied to the cellular-based D2D communication, an increase in control complexity in a base station and a D2D communication terminal may be caused. In order to overcome the above-described problem, in the present invention, an adaptive modulation and coding method for link adaptation in a D2D communication based on cellular mobile communication is proposed.

Figure 2:
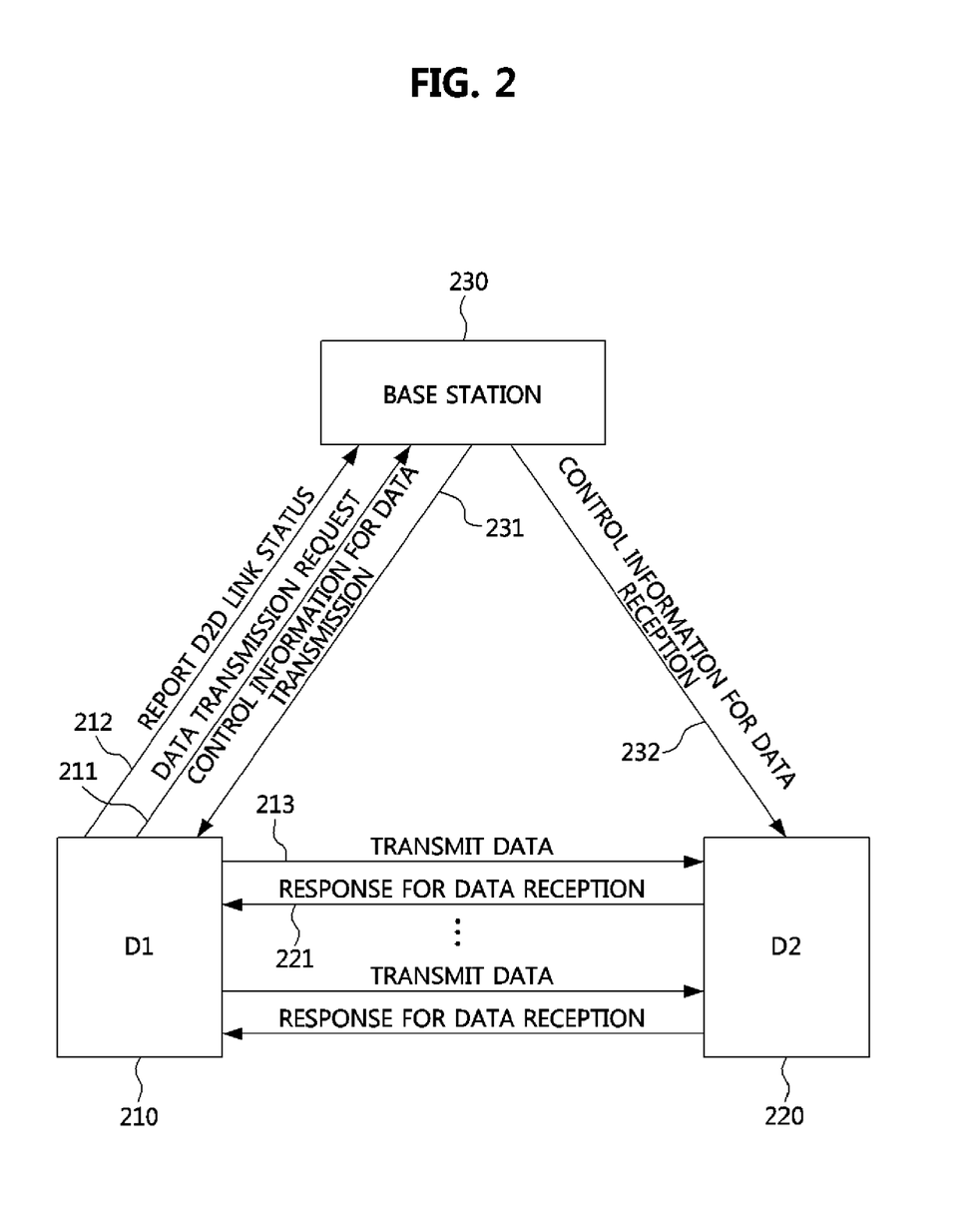
FIG. 2 is a conceptual diagram for describing a procedure for a link adaptation transmission and reception method in device-to-device (D2D) communication based on cellular mobile communication according to an embodiment of the present invention.

FIG. 2 is a conceptual diagram for describing a procedure for a link adaptation transmission and reception method of D2D communication based on cellular mobile communication according to an embodiment of the present invention.

Referring to FIG. 2, the link adaptation transmission and reception method of the D2D communication according to an embodiment of the present invention will be described through a control message exchanging and data transmission and reception process between a terminal pair participating in D2D communication with a base station.

A transmission terminal (first terminal; 210) transmits a data transmission request for a reception terminal (second terminal; 220) to a base station in operation 211, and the first terminal 210 or the second terminal 220 may report a D2D link status to a base station 230 (in FIG. 2, the first terminal notifies the D2D link status in operation 211).

Meanwhile, the transmission terminal may first transmit a data transmission request 212 for an opposite terminal to the base station, and then a link status notification 211 between the transmission terminal and the opposite terminal may be performed. However, the data transmission request 212 and the link status notification 211 may be simultaneously performed, or the link status notification 211 may be performed before the data transmission request 212.

The base station provides, to the transmission terminal 210 and the reception terminal 220, control information for data transmission and reception in a D2D link based on the D2D link status notification 211 and the data transmission request 212.

In this instance, the control information for data transmission and reception may be respectively provided as control information for data transmission on the transmission terminal (first terminal) side, and as control information for data reception on the reception terminal (second terminal) side.

Alternatively, the base station 230 may provide the control information for data transmission and reception to both terminals in a multicast scheme, the transmission terminal may recognize the provided control information as the control information for data transmission, and the reception terminal may recognize the provided control information as the control information for data reception.

In FIG. 2, the base station provides the control information for data transmission and the control information for data reception to the first terminal and the second terminal, respectively.

In operation 213, the transmission terminal transmits data based on the control information for data transmission, and the reception terminal receives data based on the control information for data reception.

In operation 221, the reception terminal directly transmits a response for data reception to the transmission terminal.

Next, the transmission terminal and the reception terminal may repeatedly perform data transmission and data reception response.

Figure 3:
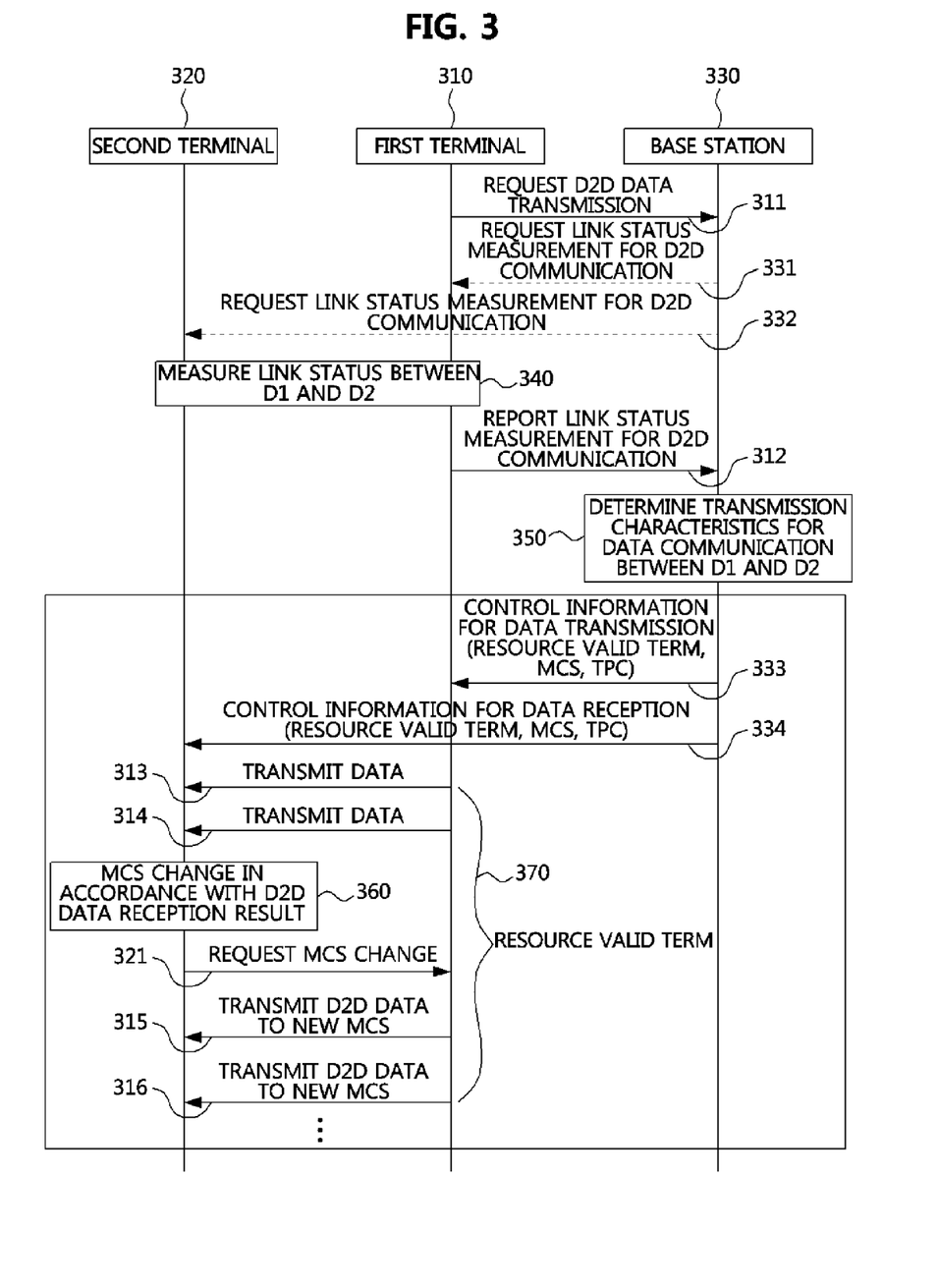
FIG. 3 is a message flowchart between a base station and a D2D terminal pair for further describing a link adaptation transmission and reception method in a D2D communication based on cellular mobile communication according to an embodiment of the present invention.

FIG. 3 is a message flowchart between a base station and a D2D terminal pair for further describing a link adaptation transmission and reception method in a D2D communication based on cellular mobile communication according to an embodiment of the present invention.

Referring to FIG. 3, a device desiring data transmission on a D2D link transmits a D2D data transmission request to a base station (data transmission from a first terminal to a second terminal in an example of FIG. 3).

The base station that has received the D2D data transmission request requires status measurement of a D2D link in which communication is to be performed, and receives a notification of the link status measurement result.

In this instance, even when the base station does not explicitly require the status measurement of the D2D link, the transmission terminal may measure the link status and report the measurement result to the base station.

In addition, as described above, the transmission terminal first transmits the data transmission request for the opposite terminal to the base station, and then performs a link status notification between the transmission terminal and the opposite terminal. However, the data transmission request and the link status notification may be simultaneously performed, or the link status notification may be performed before the data transmission request.

In operation 350, the base station that has received the notification for the D2D link status determines at least one of the following transmission characteristic parameters for data transmission from the first terminal to the second terminal based on measurement information.

1) Radio resource for data transmission and reception

2) Valid term of the radio resource for data transmission and reception (a corresponding radio resource is used in data transmission from the first terminal to the second terminal during the valid term, that is, the valid term of the radio resource for data transmission and reception may refer to a term during which resources allocated to terminals participating in D2D communication for a D2D link are efficiently scheduled, or a term during which link adaptation transmission may be performed through D2D signaling without control of the base station)

3) Modulation and coding scheme (MCS) to be used in data transmission

4) Transmission power-related information for data transmission, for example, power control information (TPC: transmit power control)

5) Transmission mode for data transmission, for example, multi-antenna transmission mode (diversity, spatial multiplexing or beamforming, and the like)

Based on the determined parameter, the base station transmits control information 333 for data transmission including the parameter and control information 334 for data reception including the parameter to a transmission device and a reception device, respectively.

In this instance, the control information for data transmission and reception may be provided to the transmission terminal side (the first terminal) as the control information for data transmission, and to the reception terminal side (the second terminal) as the control information for data reception.

Alternatively, the base station 330 may provide the control information for data transmission and reception to both terminals in a multicast scheme, the transmission terminal may recognize the provided control information as the control information for data transmission, and the reception terminal may recognize the provided control information as the control information for data reception.

In FIG. 3, the base station provides the control information for data transmission and the control information for data reception to the first terminal and the second terminal, respectively.

The control information for data transmission and reception may be transmitted to the terminal through radio resource control (RRC) signaling from the base station, or transmitted to the terminal through a downlink control channel.

In operations 313 and 314, the transmission terminal transmits data based on MCS specified in the base station on the basis of the control information for data transmission, and the reception terminal receives data based on the control information for data reception.

Meanwhile, the reception terminal determines a change in the MCS in operation 360 when the change in the MCS is required in response to a data reception response from an opposite terminal, and requests the change in the MCS directly from the transmission terminal.

In this case, in operation 321, the reception terminal requires the change in the MCS directly from the transmission terminal without intervention of the base station in an MCS change procedure.

In operations 315 and 316, the transmission terminal applies new MCS to transmit data, and the reception terminal receives the data transmitted by the transmission terminal based on the new MCS.

In this instance, during a valid term 370 of resources allocated by the base station, adaptive modulation and coding may be performed through direct signaling between the transmission terminal and the reception terminal, a notification for a link status may not be transmitted to the base station, and control from the base station may not be performed.

The message flow and data transmission between the transmission terminal and the reception terminal during the above-described resource valid term will be described with reference to FIG. 4.

During the resource valid term, the transmission terminal and the reception terminal may perform link adaptation transmission and reception in accordance with a procedure defined by both the transmission terminal and the reception terminal without any control of the base station. In this case, the transmission terminal and the reception terminal may perform the link adaptation transmission and reception based on at least one of whether ACK/NACK feedback with respect to data transmission is received, MCS parameters included in ACK/NACK feedback signals, reception quality of the ACK/NACK feedback signals, and signal quality of data reception.

Figure 4:
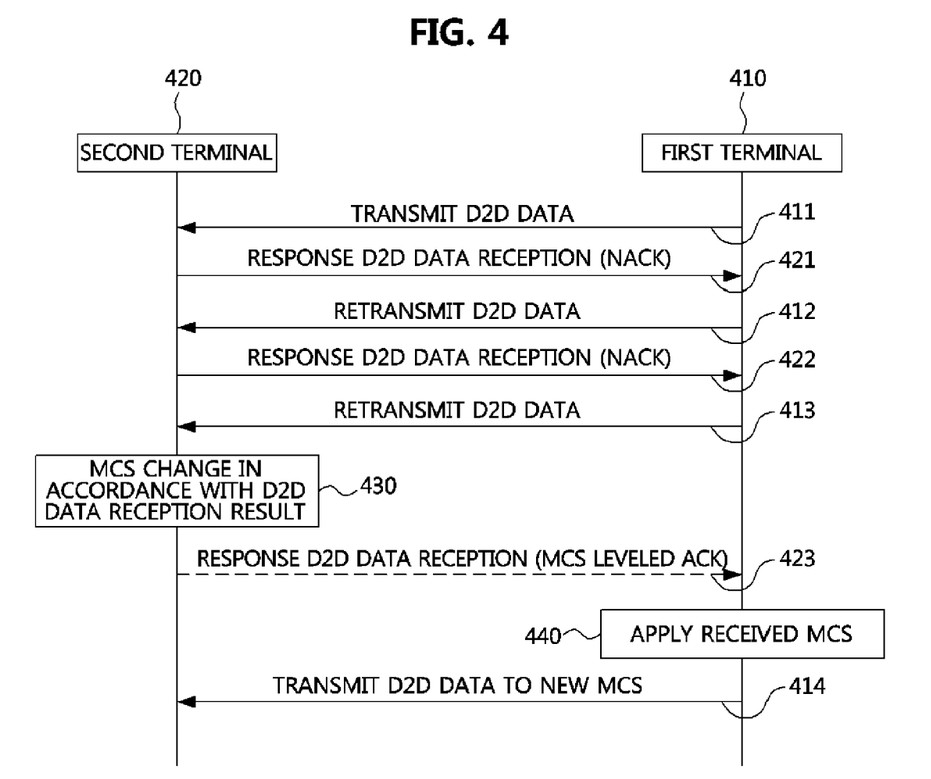
FIG. 4 is a message flowchart for describing changes in an adaptive modulation order and a coding rate according to an embodiment of the present invention.

FIG. 4 is a message flowchart for describing changes in an adaptive modulation order and a coding rate according to an embodiment of the present invention.

Referring to FIG. 4, an example of a process for adaptively changing a modulation order and a coding rate based on a data reception response in the link adaptation transmission and reception method in cellular mobile communication-based D2D communication according to an embodiment of the present invention is illustrated.

First, in operation 411, a transmission terminal (first terminal; 410) transmits data to a reception terminal (second terminal; 420) based on a given MCS value. In this instance, the given MCS value may be an MCS value included in control information for data transmission which has been received from the base station as described above in FIGS. 2 and 3.

In this instance, the reception terminal 420 may transmit negative acknowledge (NACK) feedback to the transmission terminal 410 in operations 421 and 422 when failing in data reception. In this case, according to an embodiment, when the reception terminal is not received an ACK feedback during a predetermined period of time without an NACK feedback, the transmission terminal may recognize that data reception on the reception terminal side fails.

The transmission terminal that has received the NACK feedback from the reception terminal (or the transmission terminal failing in reception of ACK feedback for a predetermined period of time) may retransmit data in operations 412 and 413.

In this instance, when retransmitting data in which a transmission error occurs, the transmission terminal may maintain the same transportation block (TB) size as in the previous transmission, and retransmit data to the same MCS as in the previous transmission.

Alternatively, MCS with respect to data to be retransmitted may be configured different from the previous transmission based on predetermined rules.

Meanwhile, when succeeding in data reception, the reception terminal may transmit a MCS leveled ACK feedback to the transmission terminal.

In this instance, the MCS leveled ACK feedback corresponds to a feedback that is used when the reception terminal transmits information designating an MCS level to be used in the following data transmission to the transmission terminal together with ACK with respect to the previous data reception. That is, the MCS leveled ACK may be operated as an indicator for maintaining a current MCS or designating the MCS level to be used in the following transmission.

For the same purpose, information about the indicator for maintaining the current MCS or designating the MCS level to be used in the following transmission may be included in the NACK feedback to be transmitted. This is called MCS leveled NACK feedback.

The reception terminal may determines a change in the MCS based on accumulative D2D data reception results (for example, the number of times of NACK feedback that occurs for a predetermined period of time, and the like) in operation 430, and transmit MCS leveled ACK feedback (or MCS leveled NACK feedback) including the changed MCS information to the transmission terminal in operation 423.

As described above, the MCS leveled ACK feedback or the MCS leveled NACK feedback may include information for indicating to maintain the MCS applied in the previous transmission as is.

The transmission terminal that has received the MCS leveled ACK (or MCS leveled NACK) determines MCS information to be transmitted from the MCS leveled ACK (or MCS leveled NACK) in operation 440, and transmit data in which the MCS is applied in operation 414.

Meanwhile, in the above described embodiment, an example in which the reception terminal side determines the change in the MCS and notifies the changed MCS to the transmission terminal side has been described, but the transmission terminal side may determine the change in the MCS and notify the changed MCS to the reception terminal side.

For example, the transmission terminal side may determine the change in the MCS based on feedback information from the reception terminal.

For example, when the ACK feedback from the reception terminal is repeated for a predetermined period of time or continuously or when the NACK feedback is repeated for a predetermined period of time or continuously, the change in the MCS may be determined.

In addition, in the above described embodiment, an example in which ACK/NACK feedback and an MCS level determined by enabling parameters to be included in the ACK/NACK feedback (MCS leveled ACK feedback or MCS leveled NACK feedback) are notified to an opposite side has been described, but the transmission terminal and the reception terminal may increase or reduce the MCS level in accordance with whether ACK and NACK are repeated on the reception terminal side by predetermined rules, without specific signaling for the change in the MCS.

In addition, in the above described embodiment, an example in which the MCS level is determined in accordance with ACK/NACK feedback has been described, but the MCS level may be directly determined based on at least one of reception quality of ACK/NACK feedback signals and signal quality of data reception.

Hereinafter, for further detail description, in the link adaptation method according to the present invention, operations of the terminal side and operations of the base station side that controls terminals performing D2D communication will be described.

Figure 5:
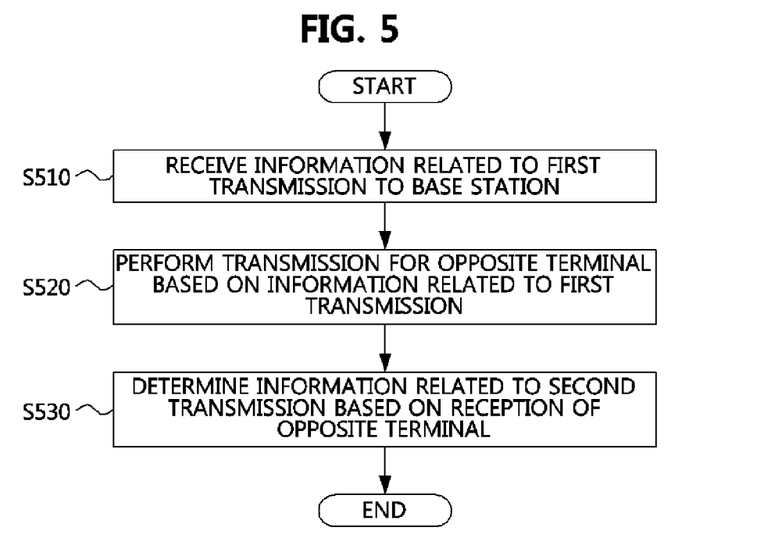
FIG. 5 is a flowchart for describing an operation method of a terminal that performs link adaptation transmission and reception in D2D communication of a cellular-based mobile communication system according to an embodiment of the present invention.
Figure 6:
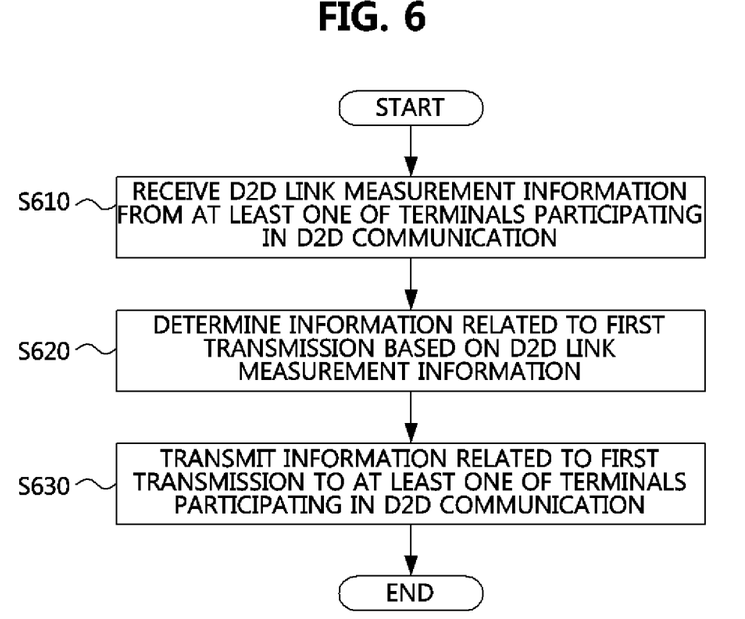
FIG. 6 is a flowchart for describing an operation method of a base station that controls link adaptation transmission and reception between terminals in D2D communication of a cellular-based mobile communication system according to an embodiment of the present invention.

However, operation methods of the terminal and the base station which will be described with reference to FIGS. 5 and 6 are merely described by separating subjects of operations for convenience of description in the procedures according to the present invention described in FIGS. 2 to 4, and it should be noted that the operations of the terminal and the base station are not limited to FIGS. 5 and 6.

FIG. 5 is a flowchart for describing an operation method of a terminal that performs link adaptation transmission and reception in D2D communication of a cellular-based mobile communication system according to an embodiment of the present invention.

Referring to FIG. 5, the operation method of the terminal in the link adaptation transmission method according to the present invention may include operation 510 of receiving information related to first transmission through a D2D link from a base station, operation 520 of performing transmission for an opposite terminal using the information related to the first transmission, and an operation 530 of determining information related to second transmission after the transmission based on reception from the opposite terminal.

The above-described operation method of the terminal may further include operation of measuring a link status with the opposite terminal to report the measurement result to the base station.

In this instance, the terminal may receive a request for link status measurement from the base station, measure the link status with the opposite terminal in response to the request, and report the measurement result to the base station. That is, the terminal may measure the link status with the opposite terminal without an explicit request of the base station, and report the measurement result to the base station.

In operation 510, the first transmission may refer to initial transmission between a transmission terminal and a reception terminal which participate in D2D communication through a D2D communication link (D2D link).

In operation 510, the information related to the first transmission that is received from the base station by the terminal may include at least one of radio resources for data transmission, MCS to be used in data transmission, transmission power-related information for data transmission, and a transmission mode for data transmission, as described above.

When the radio resource for data transmission is included in the information related to the first transmission, the information related to the first transmission may further include information about a valid term of the radio resource for data transmission.

In operation 510, the information related to the first transmission may be transmitted to the terminal from the base station using a radio resource control (RRC) layer message or a downlink control channel.

In operation 520, the terminal that has received the information related to the first transmission in operation 510 performs transmission for the opposite terminal using information included in the information related to the first transmission.

For example, the terminal may determine the radio resource for data transmission with respect to the opposite terminal using the information about the radio resource for data transmission included in the information related to the first transmission, and determine an MCS for data transmission, a transmission mode, and transmission power using the MCS information, and the transmission mode and transmission power related information.

Finally, in operation 530, the terminal may determine information related to second transmission after the first transmission (initial transmission).

The information related to the second transmission may be at least one of MCS to be used in data transmission, transmission power-related information for data transmission, and a transmission mode for data transmission.

A process in which a terminal determines the information related to the transmission after the initial transmission has been described with reference to FIG. 4, and the information related to the second transmission may be determined using at least one of whether an ACK or NACK message is received from the opposite terminal, reception quality of the ACK or NACK message from the opposite terminal, parameters included in the ACK or NACK message from the opposite terminal, and data reception quality from the opposite terminal.

FIG. 6 is a flowchart for describing an operation method of a base station that controls link adaptation transmission and reception between terminals in D2D communication of a cellular-based mobile communication system according to an embodiment of the present invention.

Referring to FIG. 6, in the link adaptation transmission method according to the present invention, the operation method of the base station may include operation 610 of receiving measured information of a D2D link from at least one terminal among terminal pairs participating in the D2D communication, operation 620 of determining information related to a first transmission through the D2D link based on the measured information, and operation 630 of transmitting the information related to the first transmission to the at least one terminal among the terminal pairs participating in the D2D communication.

The measured information of the link status in operation 610 may include a CQI as a channel status notification.

Meanwhile, the operation method of the base station may further include receiving, by the base station, a data transmission request for the opposite terminal (that is, the reception terminal) from the at least one terminal (that is, the transmission terminal) of the terminal pairs participating in the D2D communication before operation 610 of receiving the measured information, and requesting link status measurement for the D2D link from the at least one terminal of the terminal pairs participating in the D2D communication.

In operation 620, the first transmission may refer to initial transmission between a transmission terminal and a reception terminal which participate in the D2D communication through a D2D communication link.

In operation 620, the information related to the first transmission that is determined by the base station based on the measurement result of the link status may include at least one of a radio resource for data transmission, MCS to be used in data transmission, a transmission power-related information for data transmission, and a transmission mode for data transmission, as described in operation 510 of FIG. 5.

When the radio resource for data transmission is included in the information related to the first transmission, the information related to the first transmission may further include information about a valid term of the radio resource for data transmission.

In operation 630, the information related to the first transmission may be transmitted to the terminal from the base station using an RRC layer message or a downlink control channel.

As described above, according to the embodiments of the present invention, the adaptive modulation and coding method with respect to data transmission on the D2D link may be provided while minimizing control of the base station, thereby reducing the complexity of a cellular network due to the D2D communication.

Therefore, when the link adaptation method according to the present invention is used, performance of the entire cellular system may be improved.

In addition, the link adaptation method according to the present invention may make D2D transmission reflecting transmission characteristics on the D2D link possible without an excessive control procedure, thereby improving efficiency of the terminal and the base station.

While the example embodiments of the present invention and their advantages have been described in detail, it should be understood that various changes, substitutions, and alterations may be made herein without departing from the scope of the invention.

What is claimed is:

1. An operation method of a terminal in a link adaptation transmission method of device-to-device (D2D) communication, comprising:
receiving information related to a first transmission through a D2D link from a base station;
performing transmission for an opposite terminal using the information related to the first transmission; and
determining information related to a second transmission after the transmission based on reception from the opposite terminal,
wherein the information related to the first transmission includes information related to a radio resource for a data transmission and information about a valid term of the radio resource for the data transmission,
wherein a modulation and coding scheme (MCS) level is changed based on a request by the opposite terminal,
wherein, upon receiving a notification of the D2D link at the base station, determining the valid term by the base station,
wherein the valid term is based on a term during which the link adaptation transmission is performed through D2D signaling without control of the base station, and
wherein, during the valid term of the radio resource for the data transmission, the data transmission through the D2D link is controlled through direct signaling between the terminal and the opposite terminal.

2. The operation method of claim 1, further comprising:
measuring, by the terminal, a link status with the opposite terminal to report the measurement result to the base station.

3. The operation method of claim 2, wherein the terminal measures the link status with the opposite terminal to report the measurement result to the base station in response to a link status measurement request with the opposite terminal from the base station.

4. The operation method of claim 1, wherein the information related to the first transmission includes at least one of the MCS to be used in the data transmission, transmission power-related information for the data transmission, and a transmission mode for the data transmission.

5. The operation method of claim 1, wherein the information related to the first transmission is received from the base station using a radio resource control (RRC) layer message or a downlink control channel.

6. The operation method of claim 1, wherein the determining of the information related to the second transmission includes determining the information related to the second transmission using at least one whether an acknowledgement (ACK) or negative ACK (NACK) message is received from the opposite terminal, reception quality of the ACK or NACK message from the opposite terminal, a parameter included in the ACK or NACK message from the opposite terminal, and data reception quality from the opposite terminal.

7. An operation method of a base station in a link adaptation transmission method of device-to-device (D2D) communication, comprising:

receiving measured information of a D2D link from at least one terminal among terminal pairs participating in the D2D communication;

determining information related to a first transmission through the D2D link based on the measured information; and transmitting the information related to the first transmission to the at least one terminal among the terminal pairs participating in the D2D communication, wherein the information related to the first transmission includes information related to a radio resource for a data transmission and information about a valid term of the radio resource for the data transmission, wherein a modulation and coding scheme (MCS) level is changed based on a request by the at least one terminal among the terminal pairs participating in the D2D communication, wherein, upon receiving a notification of the D2D link at the base station, determining the valid term by the base station, wherein the valid term is based on a term during which the link adaptation transmission is performed through D2D signaling without control of the base station, and wherein, during the valid term of the radio resource for the data transmission, the data transmission through the D2D link is controlled through direct signaling between the terminal pairs participating in the D2D communication.

8. The operation method of claim 7, further comprising:

receiving, by the base station, a data transmission request for an opposite terminal from the at least one terminal of the terminal pairs participating in the D2D communication, and requesting link status measurement for the D2D link from the at least one terminal of the terminal pairs participating in the D2D communication.

9. The operation method of claim 7, wherein the information related to the first transmission includes at least one of the MCS to be used in the data transmission, transmission power-related information for the data transmission, and a transmission mode for the data transmission.

10. The operation method of claim 7, wherein the information related to the first transmission is transmitted from the base station using an RRC layer message or a downlink control channel.

* * * * *